July 21, 1959     R. DUBITSKY     2,895,641
MEASURING DISPENSER ATTACHMENT
Filed Oct. 4, 1957
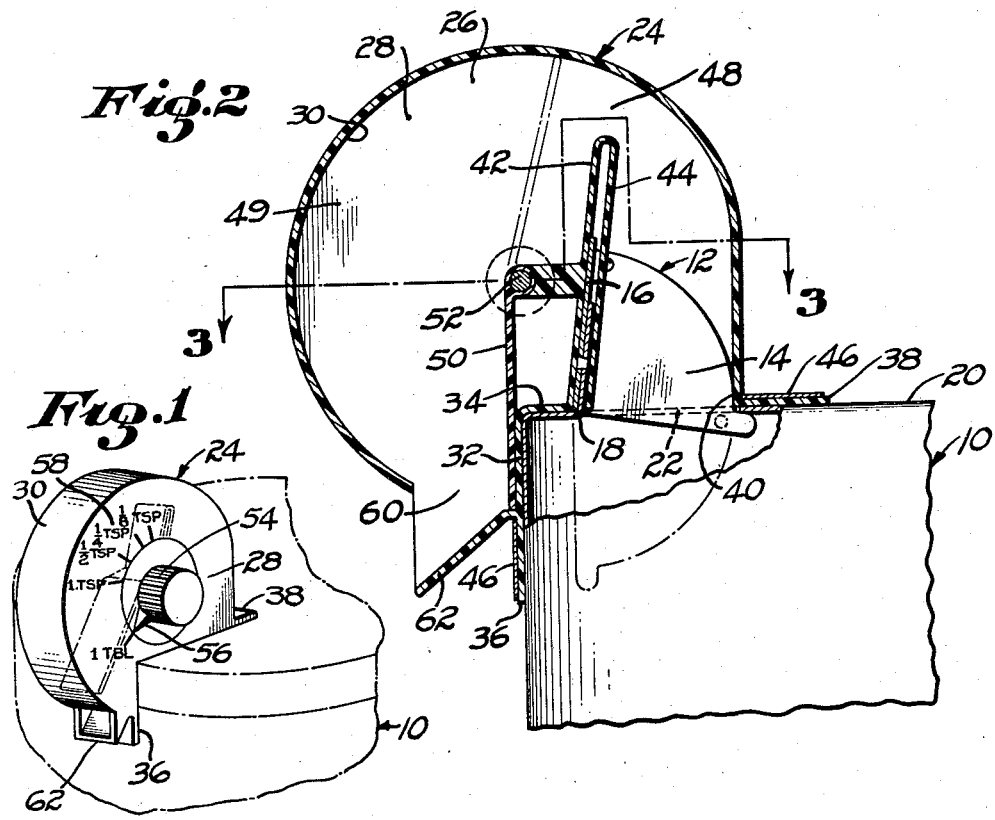
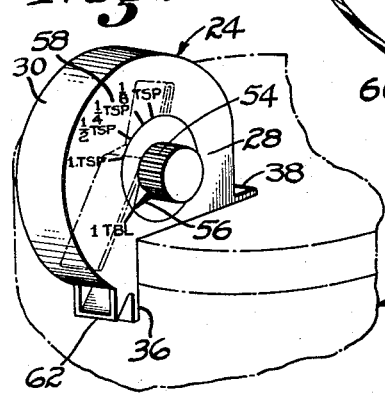
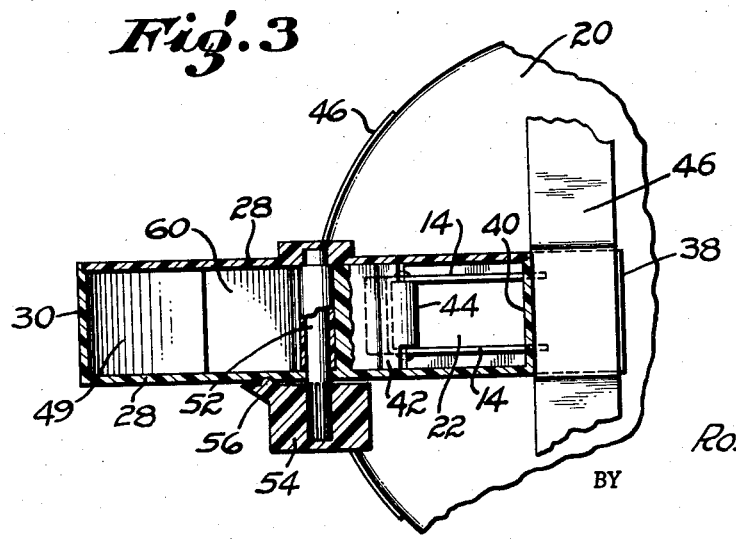
INVENTOR.
ROSE DUBITSKY
BY

United States Patent Office 2,895,641
Patented July 21, 1959

2,895,641

MEASURING DISPENSER ATTACHMENT

Rose Dubitsky, Frackville, Pa.

Application October 4, 1957, Serial No. 688,191

3 Claims. (Cl. 222—48)

This invention relates generally to dispensers for liquid and granular substances, and more particularly to a dispenser for dispensing measured amounts of such substances.

In the practice of the culinary arts, it is frequently necessary to dispense measured quantities of liquid or granular substances, such as milk, salt, sugar, etc. from containers of the same. In the past, this was usually accomplished by pouring the substance into a separate measuring cup or spoon.

Such separate measuring devices were, however, prone to being misplaced or lost. Also, the substance being dispensed was frequently spilled, and accidental overfilling of the measuring device often occurred.

A broad object of this invention is the provision of a dispenser for dispensing measured quantities of liquid and granular substances from their containers, which dispenser avoids the above-noted and other deficiencies of existing measuring devices.

A more specific object of the invention is the provision of a dispenser of the character described which is mounted directly on the container holding the substance to be dispensed.

Another object of the invention is the provision of a dispenser of the character described which may form an integral part of or assume the form of an attachment to be removably mounted on the container holding the substance to be dispensed.

A further object of the invention is the provision of a dispenser of the character described which is adjustable to vary the measured quantity of substance dispensed.

Yet a further object of the invention is the provision of a dispenser of the character described which is immune to overfilling and spilling of the substance being dispensed, easy to use, inexpensive to manufacture, and otherwise especially well suited to its intended purpose.

Other objects, advantages and features of the invention will be apparent from the following detailed description, wherein reference is had to the attached drawings, illustrating one illustrative embodiment of the invention. In this drawing:

Fig. 1 is a view in perspective of the present dispenser, mounted on a container, shown in phantom lines;

Fig. 2 is an enlarged section through the dispenser of Fig. 1; and

Fig. 3 is a section taken along line 3—3 of Fig. 2.

For purposes of illustration and description of the invention, the latter is disclosed in the form of an attachment to be mounted on a conventional salt container for dispensing measured quantities of salt therefrom. It will be apparent as the description proceeds, however, that the invention may assume various other forms and be employed for dispensing substances other than salt.

Referring now to the drawings, the numeral 10 designates a conventional salt container having an upper pouring spout 12. This spout includes a pair of spaced, generally sector-shaped side walls 14 which are joined along one edge by a rectangular wall 16.

Spout 12 is hinged at 18, along the base of the rectangular spout wall 16, to the circular top panel 20 of the container 10. Panel 20 is formed with a rectangular discharge opening 22 into which the lower edges of the spout walls extend.

Generally indicated at 24 is the present illustrative dispensing attachment. Attachment 24 will be seen to comprise a hollow disc-like housing 26. This housing is defined by a pair of spaced, parallel side walls 28 and a cylindric transverse wall 30 which rigidly joins the side walls 28 along their edges.

Housing 26 has, in effect, a radial relief at one portion of its periphery defined by a pair of perpendicular walls 32 and 34. Projecting beyond the cylindric housing wall 30, in the planes of the walls 32 and 34, is a pair of lips 36 and 38, respectively.

Wall 36 is formed with an entrance opening 40, opening into the interior of the housing 26. Rising from the wall 34 at the left-hand edge of the entrance opening 40, as the dispenser is viewed in Fig. 2, is a wall 42. Wall 42 extends across the housing 26 and is integrally joined with its side walls 28.

A laterally reduced tongue 44 is integrally connected with the upper end of the wall 42 and extends back to the plane of the entrance opening 40 in slightly spaced relation to the wall 42. When the dispenser is mounted on the container 10, the dispenser walls 32, 34 and lips 36, 38 seat against the top and side walls of the container, and the spout 12 extends through the dispenser entrance opening 40 with the wall 42 and tongue 44 straddling the spout wall 16, as shown. Strips 46 of adhesive tape extending over the lips 36 and 38 serve to retain the dispenser on the container.

It will be observed that the upper ends of the wall 42 and tongue are spaced from the cylinder wall 30 to define a passage 48. Passage 48 communicates the entrance opening 40 to the semi-cylindric chamber 49 in the left-hand portion of the housing.

From this description, it will be seen that salt, or other substance in the container 10, may pass from the latter through the entrance opening 40, through the passage 48 into the chamber 49. Located in this chamber is a pivotal partition 50. Partition 50 is fixed to an axle 52 which is journalled in the side walls 28 of the housing for rotation about the axis of the semi-cylindric transverse wall portion 30. A handle 54 is fixed to this axle exterior of the housing to permit swinging of the partition 50.

Partition 50 slideably engages the housing walls 28 and 30. It will be seen, therefore, that the effective volume of the chamber 49 may be varied by swinging of the partition 50.

Fixed to the handle 54 is a pointer 56 which moves over a scale 58 inscribed on the adjacent side wall 28 of the housing 26. Scale 58 is calibrated to indicate the volume of the chamber 49, in terms of teaspoons, tablespoons, cups, etc., for various angular positions of the partition 50.

Counterclockwise turning of the partition 50 to its solid line limiting position uncovers a discharge opening 60 for the chamber 49, formed in the cylindric wall 30. This opening has a spout 62.

Use of the dispenser will be obvious from the above description. Thus, after setting of the partition 50 at the desired position in accordance with the desired quantity of substance to be dispensed from the container 10, as indicated on the scale 58, the container 10 is tipped to pour substance from the container into chamber 49 through the entrance opening 40 and passage 48. When the chamber 49 is filled, the container is returned to its normal upright position. The wall 42 prevents the substance from flowing back into the container.

Chamber 49 then contains the desired quantity of substance. Partition 50 is now turned to its solid line position of Fig. 2, to uncover the discharge opening 60 to enable the measured amount of substance contained in chamber 49 to flow from the latter.

As preliminarily indicated, the present dispenser may, if desired, be made as an integral part of the container and may be used to dispense either granular or liquid substances.

While certain embodiments of the invention have been described and shown for illustrative purposes, it will be apparent that numerous modifications in design and arrangement of parts are possible within the scope of the following claims.

I claim:

1. A dispenser comprising a hollow, generally disc-like housing having flat, parallel side walls and an edge wall, a fixed partition in said housing in a transverse plane of said side walls and integrally joined along opposite sides to said side walls and along one end to said edge wall, said partition separating the interior of said housing into first and second chambers, said edge wall having a discharge opening and an inlet opening located at opposite sides of and immediately adjacent to said one end of said partition communicating with said first and second chambers, respectively, there being a space between the other end of said partition and said edge wall communicating said chambers, a movable partition in and slidably engaging the walls of said first chamber, means pivoting one end of said movable partition on said fixed partition for turning on an axis perpendicular to said side walls, the portion of said edge wall bounding said first chamber being cylindrically curved about said axis, said movable partition being adjustable to vary the volume of said first chamber between said space and movable partition, said movable partition normally blocking said discharge opening and being swingable toward said one end of the fixed partition to uncover the latter opening, means for pivoting said movable partition exteriorly of said housing, and means for indicating said volume.

2. The subject matter of claim 1 wherein said inlet opening opens through said edge wall in a direction approximately parallel to said fixed partition.

3. The subject matter of claim 1 wherein said inlet opening is rectangular for receiving the pouring spout of a container and the portion of said edge wall bounding said inlet opening is flat for resting on the top of the container.

References Cited in the file of this patent
UNITED STATES PATENTS

| | | |
|---|---|---|
| 998,902 | Hoyt | July 25, 1911 |
| 2,401,648 | Gumilar | June 4, 1946 |